United States Patent
Kunishi et al.

(10) Patent No.: US 8,341,815 B2
(45) Date of Patent: Jan. 1, 2013

(54) METHOD FOR MANUFACTURING LAMINATED ELECTRONIC COMPONENT

(75) Inventors: Tatsuo Kunishi, Moriyama (JP); Yoshihiko Takano, Otsu (JP); Shigeyuki Kuroda, Sabae (JP); Akihiro Motoki, Fukui (JP); Hideyuki Kashio, Nanjyo-gun (JP); Takashi Noji, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 276 days.

(21) Appl. No.: 12/796,688

(22) Filed: Jun. 9, 2010

(65) Prior Publication Data

US 2010/0243133 A1    Sep. 30, 2010

Related U.S. Application Data

(60) Division of application No. 12/030,282, filed on Feb. 13, 2008, now Pat. No. 8,154,849, which is a continuation of application No. PCT/JP2006/320200, filed on Oct. 10, 2006.

(30) Foreign Application Priority Data

Oct. 28, 2005  (JP) .................... 2005-314722

(51) Int. Cl.
    *H01G 4/228*  (2006.01)
(52) U.S. Cl. ............. 29/25.42; 29/830; 29/851; 29/842; 29/874; 205/118
(58) Field of Classification Search .............. 29/25.42, 29/830, 851, 842, 874; 205/118
See application file for complete search history.

(56) References Cited

U.S. PATENT DOCUMENTS

| | | | |
|---|---|---|---|
| 6,621,682 B1 * | 9/2003 | Takakuwa et al. | 361/306.3 |
| 7,589,951 B2 * | 9/2009 | Kunishi et al. | 361/306.3 |
| 8,154,849 B2 * | 4/2012 | Kunishi et al. | 361/306.3 |
| 2004/0174656 A1 * | 9/2004 | MacNeal et al. | 361/306.3 |
| 2005/0274622 A1 * | 12/2005 | Sun et al. | 205/209 |

OTHER PUBLICATIONS

Kunishi et al.; "Laminated Electronic Component and Method for Manufacturing the Same"; U.S. Appl. No. 12/030,282, filed Feb. 13, 2008.

Kunishi et al.; "Method of Manufacturing Multilayer Electronic Component"; U.S. Appl. No. 12/041,889, filed Mar. 4, 2008.

Motoki et al.; "Multilayer Electronic Component and Method for Manufacturing Multilayer Electronic Component"; U.S. Appl. No. 12/055,372, filed Mar. 26, 2008.

(Continued)

*Primary Examiner* — Derris Banks
*Assistant Examiner* — Kaying Kue
(74) *Attorney, Agent, or Firm* — Keating & Bennet, LLP

(57) ABSTRACT

A laminate is prepared in which adjacent internal electrodes are electrically insulated from each other at an end surface at which the internal electrodes are exposed, a space between the adjacent internal electrodes, which is measured in the thickness direction of insulating layers, is about 10 μm or less when a withdrawn distance of the adjacent internal electrodes from the end surface is about 1 μm or less, and is about 20 μm or less when a protruding length of the adjacent internal electrodes from the end surface is at least about 0.1 μm. In an electroplating step, electroplating deposits deposited on the ends of the adjacent internal electrodes are grown so as to be connected to each other.

18 Claims, 5 Drawing Sheets

OTHER PUBLICATIONS

Motoki et al.; "Multilayer Electronic Device and Method for Manufacturing the Same"; U.S. Appl. No. 12/109,371, filed Apr. 25, 2008.

Motoki et al.; "Multilayer Electronic Component and Method for Manufacturing the Same"; U.S. Appl. No. 12/110,484, filed Apr. 28, 2008.

Kunishi et al., "Laminated Electronic Component and Method for Manufacturing the Same", U.S. Appl. No. 12/030,360, filed Feb. 13, 2008.

Tani, "Multilayer Electronic Component and Method for Manufacturing the Same", U.S. Appl. No. 12/481,690, filed Jun. 10, 2009.

Ito et al., "Laminated Ceramic Electronic Component", U.S. Appl. No. 12/489,631, filed Jun. 23, 2009.

Sasabayashi, "Multilayer Ceramic Electronic Component", U.S. Appl. No. 12/765,965, filed Apr. 23, 2010.

* cited by examiner

US 8,341,815 B2

METHOD FOR MANUFACTURING LAMINATED ELECTRONIC COMPONENT

BACKGROUND OF THE INVENTION

1. Field of the Invention

The present invention relates to a laminated electronic component and a method for manufacturing the same, and more particularly relates to a laminated electronic component, which includes external electrodes directly provided on external surfaces of a laminate by plating, and to a method for manufacturing the same.

2. Description of the Related Art

As shown in FIG. 11, a laminated electronic component 101, represented by a multilayer ceramic capacitor, includes a laminate 105 including insulating layers 102 laminated to each other and layer-shaped internal electrodes 103 and 104 which are arranged along interfaces between the insulating layers 102. Ends of the internal electrodes 103 and ends of the internal electrodes 104 are exposed at one end surface 106 and the other end surface 107 of the laminate 105, respectively, and external electrodes 108 and 109 are arranged so as to be electrically connected between the ends of the internal electrodes 103 and between the ends of the internal electrodes 104, respectively.

When the external electrodes 108 and 109 are formed, paste electrode layers 110 are first formed by applying a metal paste including a metal component and a glass component on the end surfaces 106 and 107 of the laminate 105, followed by firing. Next, on the paste electrode layers 110, first plating layers 111 primarily composed of, for example, Ni are formed, and second plating layers 112 primarily formed of, for example, Sn are further formed thereon. That is, each of the external electrodes 108 and 109 is formed to have a three-layered structure including the paste electrode layer 110, the first plating layer 111, and the second plating layer 112.

When the laminated electronic component 101 is mounted on a substrate using solder, the external electrodes 108 and 109 must have good wettability to the solder. At the same time, the external electrode 108 must provide electrical connection between the internal electrodes 103, which are electrically insulated from each other, and the external electrode 109 must provide electrical connection between the internal electrodes 104, which are electrically insulated from each other. The second plating layer 112 ensures the solder wettability, and the electrical connections between the internal electrodes 103 and between the internal electrodes 104 are provided by the respective paste electrode layers 110. The first plating layer 111 prevents being lost by solder during solder bonding.

However, the paste electrode layer 110 has a relatively large thickness of several tens to several hundreds of micrometers. Thus, when this laminated electronic component 101 is formed to have dimensions within predetermined standard values, in order to ensure the volume of the paste electrode layers 110, an effective volume necessary to obtain electrostatic capacitance must be unfavorably decreased corresponding to the volume of the paste electrode layers 110. On the other hand, since the thicknesses of each of the plating layers 111 and 112 are approximately several micrometers, when the external electrodes 108 and 109 are formed of only the first plating layer 111 and the second plating layer 112, a larger effective volume necessary to obtain electrostatic capacitance is ensured.

For example, in Japanese Unexamined Patent Application Publication No. 2004-146401, a method is disclosed in which a conductive paste is applied to at least edge portions of end surfaces of a laminate in the lamination direction of internal electrodes so as to be in contact with extraction portions of the internal electrodes, this conductive paste is then formed into conductive films by firing or heat-curing, and electroplating is further performed on the end surfaces of the laminate to form electroplating films so as to be connected to the conductive films on the edge portions. According to this method, the thickness of the external electrode at the end surface can be decreased.

In addition, in Japanese Unexamined Patent Application Publication No. 63-169014, a method is disclosed in which conductive metal layers are deposited by electroless plating on entire sidewall surfaces of a laminate at which internal electrodes are exposed so that the internal electrodes exposed at each sidewall surface are short-circuited to each other.

However, with the method for forming external electrodes disclosed in Japanese Unexamined Patent Application Publication No. 2004-146401, although the exposed internal electrodes can be directly connected to the respective electroplating films, since it is necessary to ensure electrical connection of the extraction portions of the exposed internal electrodes before the electroplating is performed, conductive portions must be formed using a conductive paste. A step of applying this conductive paste at specific locations is very complicated. Furthermore, since the thickness of the conductive paste is relatively large, the effective volume rate is disadvantageously decreased.

In addition, in the method disclosed in Japanese Unexamined Patent Application Publication No. 2004-146401, if the conductive paste is not formed, since the ends of the internal electrodes of the laminate are withdrawn from the exposed surface before the plating is performed, a problem may arise in that electrically conductive media are not likely to be in contact with the internal electrodes during the electroplating. In this case, not only is the plating efficiency considerably decreased, but the uniformity of the plating layer is also degraded, thereby resulting in a degradation of humidity resistance of a laminated electronic component.

According to the method disclosed in Japanese Unexamined Patent Application Publication No. 63-169014, since the plating film is formed by an electroless plating method, problems arise in that the rate of forming the plating film is very low, and the density of the obtained plating film is low. In order to improve the above situation, a method in which a catalytic substance, such as Pd, is formed before the plating film is formed may be used. However, when this method is used, a problem arises in that the process becomes complicated. In addition, another problem arises in that the plating film is liable to be deposited at a location other than a desired location.

SUMMARY OF THE INVENTION

To overcome the problems described above, a preferred embodiment of the present invention provides a method for manufacturing a laminated electronic component, which has a high effective volume rate and outstanding humidity resistance, by forming external electrodes of the laminated electronic component substantially only from electroplating layers.

Another preferred embodiment of the present invention provides a method for easily forming external electrodes from dense plating layers without forming paste electrode layers and/or using a catalyst beforehand to form external electrodes.

Still another preferred embodiment of the present invention provides a laminated electronic component manufactured by the method described above.

A preferred embodiment of the present invention provides a method for manufacturing a laminated electronic component, including a step of preparing a laminate including insulating layers laminated to each other, and internal electrodes formed along interfaces between the insulating layers, ends of the internal electrodes being exposed at a predetermined surface, and a step of forming an external electrode on the predetermined surface of the laminate so that the ends of the internal electrodes exposed at the predetermined surface of the laminate are electrically connected to each other.

According to this preferred embodiment, in order to overcome the problems described above, the laminate is prepared in which the internal electrodes adjacent to each other are electrically insulated from each other at the predetermined surface at which the internal electrodes are exposed, the space between the internal electrodes adjacent to each other, which is measured in the thickness direction of the insulating layers, is about 10 μm or less, and a withdrawn distance of the internal electrodes from the predetermined surface is about 1 μm or less.

Preferably, the laminate is prepared such that the internal electrodes adjacent to each other are electrically insulated from each other at the predetermined surface at which the internal electrodes are exposed, the space between the internal electrodes adjacent to each other, which is measured in the thickness direction of the insulating layers, is about 20 μm or less, and a protruding length of the internal electrodes from the predetermined surface is at least about 0.1 μm, for example.

Preferably, the step of forming an external electrode includes an electroplating step of performing electroplating directly on the ends of the internal electrodes exposed at the predetermined surface of the laminate, and the electroplating step includes a step of performing plating growth of electroplating deposits deposited on the ends of the internal electrodes so that the electroplating deposits are connected to each other.

The control of the withdrawn distance of the internal electrodes or the protruding length thereof are preferably performed by an abrading step of abrading the laminate using an abrasive, which is performed before the step of forming an external electrode. In this abrading step, sandblasting or barrel abrading is preferably performed.

When the electroplating step includes a step of depositing the electroplating deposits, in which the laminate and electrically conductive media are charged in a container provided with electricity supply terminals, the container is preferably immersed in a plating solution including metal ions, and electricity is supplied while the container is rotated, the rotation speed of the container is preferably selected to be at least about 10 rpm, for example.

In the electroplating step, when the laminate is charged in a container provided with electrical supply terminals, the container is immersed in a plating solution, and electricity is supplied to deposit electroplating deposits primarily composed of Ni, it is preferable that the pH of the plating solution be about 2.5 to about 6.0, and that the plating solution includes substantially no complexing agent which forms a Ni complex. In addition, as described above, when the plating deposits primarily composed of Ni are deposited, the plating solution preferably includes a brightening agent in addition to Ni ions. As the brightening agent, a material including at least sulfur as a constituent element is preferably used.

The electroplating step may include a step of depositing plating deposits primarily composed of Cu, in which the laminate is charged in a container provided with electricity supply terminals, the container is immersed in a plating solution, and electricity is supplied.

Another preferred embodiment of the present invention provides a laminated electronic component which includes a laminate including insulating layers laminated to each other, and internal electrodes formed along interfaces between the insulating layers, ends of the internal electrodes being exposed at a predetermined surface, and at least one external electrode provided on the predetermined surface of the laminate so that the ends of the internal electrodes exposed at the predetermined surface of the laminate are electrically connected to each other.

Preferably, the external electrode is primarily composed of electroplating deposits, and at the predetermined surface of the laminate at which the internal electrodes are exposed, the space between the internal electrodes adjacent to each other, which is measured in the thickness direction of the insulating layers, is about 10 μm or less, and a withdrawn distance of the internal electrodes from the predetermined surface is about 1 μm or less.

In addition, at the predetermined surface of the laminate at which the internal electrodes are exposed, the space between the internal electrodes adjacent to each other, which is measured in the thickness direction of the insulating layers, is preferably about 20 μm or less, and a protruding length of the internal electrodes from the predetermined surface is preferably at least about 0.1 μm.

When the external electrode includes plating layers, a plating layer thereof which is located closest to a surface of the laminate preferably includes Ni or Cu as a primary component.

In the laminated electronic component, the external electrodes may be provided on the same planar surface of the laminate.

Since the external electrode of the laminated electronic component are formed substantially only from electroplating deposits without using a paste electrode layer or other similar layer, a laminated electronic component having a high effective volume rate is obtained by a simple process.

In addition, since the plating method used in preferred embodiments of the present invention is an electroplating method, an electroplating solution, such as a Watt bath, having low erosion properties for the laminate can be used, and as a result, a laminated electronic component having superior humidity resistance is obtained.

Furthermore, according to preferred embodiments of the present invention, before the electroplating is performed, since the ends of the internal electrodes are sufficiently exposed at the surface at which the internal-electrodes are exposed or preferably protrude, a uniform and denser plating layer is efficiently formed.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

With reference to FIGS. 1 to 5, a laminated electronic component 1 and a method for manufacturing the same according to a first preferred embodiment of the present invention will be described.

Figure 1:
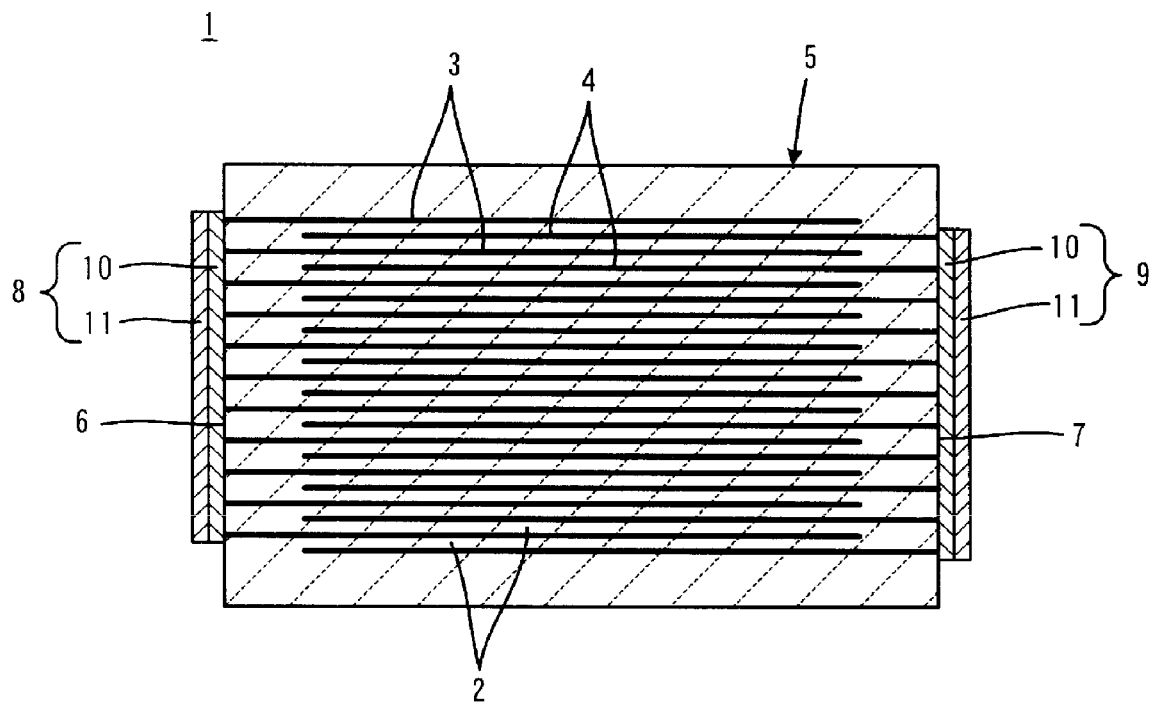
FIG. 1 is a cross-sectional view of a laminated electronic component according to a first preferred embodiment of the present invention.

As shown in FIG. 1, the laminated electronic component 1 includes a laminate 5 including insulating layers 2 which are laminated to each other, and layer-shaped internal electrodes 3 and 4 which are provided along interfaces between the insulating layers 2. When the laminated electronic component 1 is a laminated ceramic capacitor, the insulating layers 2 are made of a dielectric ceramic. At one end surface 6 and the other end surface 7 of the laminate 5, ends of the internal electrodes 3 and ends of the internal electrodes 4 are exposed, respectively, and external electrodes 8 and 9 are arranged so as to be electrically connected between the ends of the internal electrodes 3 and between the ends of the internal electrodes 4, respectively.

The external electrodes 8 and 9 are formed from electroplating deposits and include first plating layers 10, which are first formed on the end surfaces 6 and 7 at which the internal electrodes 3 and 4 are exposed, respectively, and second plating layers 11 formed on the first plating layers 10.

Since the second plating layer 11 defines an outermost layer, the second plating layer 11 must have good wettability to solder. Thus, Sn or Au is preferably used as a primary component of the second plating layer 11. In addition, since the first plating layers 10 must provide electrical connection between the internal electrodes 3 and between the internal electrodes 4, the respective internal electrodes being electrically insulated from each other, and also must prevent deteriorating by solder during solder bonding, Ni or other suitable material is preferably used as a primary component.

The plating layers 10 and 11, which define the external electrodes 8 and 9, are formed by electroplating which includes an electricity supply treatment and are not formed by electroless plating which does not include an electricity supply treatment. With electroless Ni plating, when a phosphoric acid-based or a boron-based reducing agent is used, phosphorus or boron is included in the plating deposits. However, with Ni electroplating, phosphorus and boron are not substantially included.

In addition, the external electrodes 8 and 9 are each formed substantially only from electroplating deposits and do not substantially include a conductive paste film, a vacuum deposition film, a sputtered film, or other films.

Next, a method for manufacturing the laminated electronic component 1 shown in FIG. 1, and in particular, a method for forming the external electrodes 8 and 9, will be described with reference to FIGS. 2 to 5.

Figure 2:
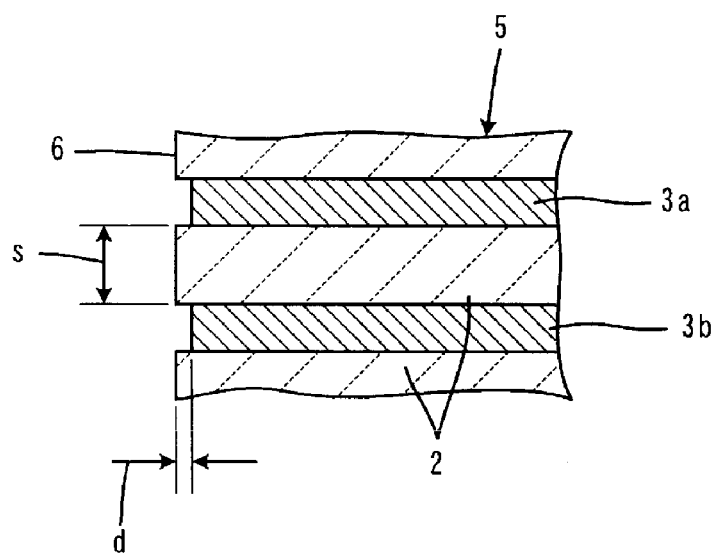
FIG. 2 is an enlarged cross-sectional view of a portion of a laminate shown in FIG. 1 at which internal electrodes are exposed.

FIG. 2 is an enlarged view showing the vicinity of one end surface 6 of the laminate 5 shown in FIG. 1 at which the internal electrodes 3 are exposed. FIG. 2 shows the state before the external electrode 8 is formed. Among the many internal electrodes 3, two internal electrodes located in the region shown in FIG. 2 are extracted and are designated by reference numerals "3a" and "3b". FIG. 2 is a view showing an arbitrary portion of the vicinity of the end surface 6 at which the internal electrodes 3 are exposed and is not a view showing specific ones of the internal electrodes 3. In addition, a plurality of the internal electrodes 3, which are represented by the internal electrodes 3a and 3b, are electrically insulated from each other at this stage.

Since the other end surface 7 and the internal electrodes 4 exposed at the other end surface 7 are substantially the same as the end surface 6 and the internal electrodes 3, the other end surface 7 and the internal electrodes 4 are not shown, and descriptions thereof are omitted.

In FIG. 2, the space between the adjacent internal electrodes 3a and 3b, which is measured in the thickness direction of the insulating layers 2, is defined as "s". In addition, a withdrawn distance of each of the internal electrodes 3a and 3b from the end surface 6 of the laminate 5 at which the internal electrodes 3 are exposed is defined as "d". Since the above withdrawn distance "d" fluctuates in a longitudinal direction (direction perpendicular to the plane of FIG. 2) of an exposed internal electrode surface, the withdrawn distance "d" in this preferred embodiment is an average value including the variations in the longitudinal direction.

In the laminate 5 before the external electrode 8 is formed, the space "s" between the adjacent internal electrodes 3a and 3b preferably is about 10 µm or less and the withdrawn distance "d" of each of the internal electrodes 3a and 3b preferably is about 1 µm or less.

In the laminated electronic component 1 defining a laminated ceramic capacitor, as a representative example, the insulating layers 2 are made of a barium titanate dielectric material, and the primary component of the internal electrodes 3 and 4 is a base metal, such as Ni or Cu. In this case, in the laminate 5 processed by firing, the internal electrodes 3 and 4 are often withdrawn to a significant extent inside from the end surfaces 6 and 7 of the laminate 5, respectively. As described above, in order to obtain a withdrawn distance "d" of about 1 µm or less, the insulating layers 2 may be milled by an abrading treatment, such as a sandblasting or a barrel abrading treatment.

Even if the withdrawn distance "d" of the internal electrodes 3 and 4 of the fired laminate 5 is already about 1 µm or less, in order to remove oxide films on the surfaces of the internal electrodes 3 and 4, and in order to roughen the surfaces thereof, the above-described abrading treatment is preferably performed. The reason for this is that in an electroplating step described below, the electroplating deposits are more easily deposited when the oxide films are removed from the surfaces of the internal electrodes 3 and 4 and when the surfaces thereof have been roughened.

Figure 3:
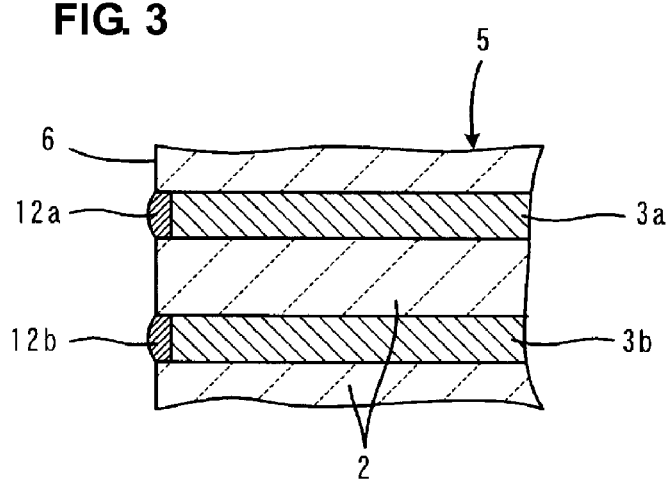
FIG. 3 is a cross-sectional view showing the state in which electroplating deposits are deposited on exposed portions of the internal electrodes shown in FIG. 2.

Next, as shown in FIG. 2, electroplating is performed, so that electroplating deposits 12a and 12b are deposited as shown in FIG. 3. When the laminated electronic component 1 is a chip type device as in this preferred embodiment, when electroplating is performed to form the external electrodes 8 and 9, although not shown in the figure, it is preferable that after the laminate 5 which is not provided with the external electrodes 8 and 9 and electrically conductive media are charged in a container provided with electrical supply terminals, and the container is then immersed in a plating solution including metal ions, electricity be supplied while the container is rotated, oscillated, or vibrated.

In the electroplating method described above, metal ions which receive electrons through the electrically conductive media are to be deposited only on conductive portions of the laminate 5, that is, on exposed portions of the internal electrodes 3a and 3b. FIG. 3 shows the electroplating deposits 12a and 12b deposited on the exposed portions. The internal electrodes 3a and 3b as described above are still electrically insulated from each other.

Figure 4:
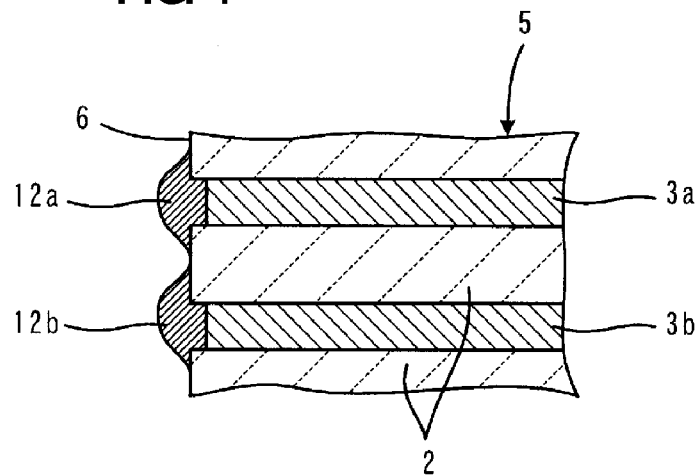
FIG. 4 is a cross-sectional view showing the state in which the electroplating deposits shown in FIG. 3 are growing.

Furthermore, when the electricity supply is continued, the deposition of the metal ions proceeds, and the electroplating deposits 12a and 12b continue to grow. This state is shown in FIG. 4. As the electroplating deposits 12a and 12b grow, the collision probability with the electrically conductive media is increased, and as a result, the deposition rate of the metal ions is increased.

Figure 5:
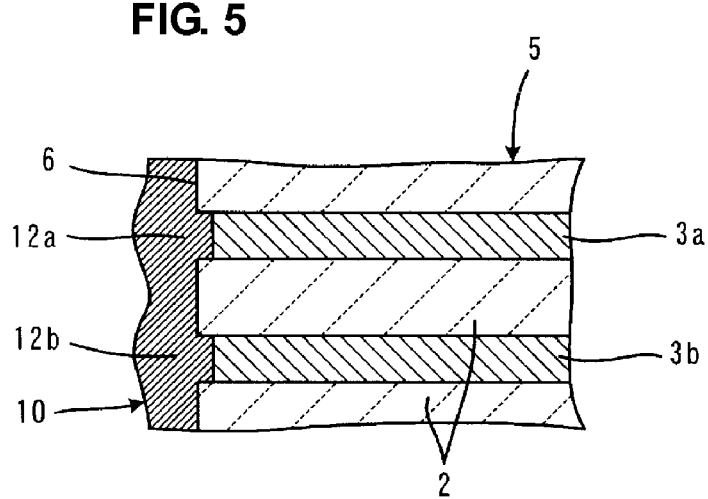
FIG. 5 is a cross-sectional view showing the state in which the grown electroplating deposits shown in FIG. 4 are united together and are about to form a first plating layer.

In addition, when the electricity supply is continued, the deposition of the metal ions proceeds, the electroplating deposit 12a and the electroplating deposits 12b, which separately grow, are brought into contact with each other and are then united together. As state described above further proceeds, the first plating layer 10 is formed so as to be electrically connected between the exposed internal electrodes 3, as shown in FIG. 5.

Next, in this preferred embodiment, when the second plating layers 11 are further formed, electroplating may be performed on the first plating layers 10 by a commonly known method. When the second plating layers 11 are formed, since the locations on which plating is to be performed are already formed into a continuous surface having electrical conductivity, the second plating layers 11 can be easily formed.

As described above, the method for forming the external electrodes 8 and 9 which were described with reference to FIGS. 2 to 5 is performed using, for example, an electroplating method with high deposition power and high ductility. Accordingly, since the electroplating deposits 12a and 12b that are deposited are likely to spread in a direction substantially parallel to the end surfaces 6 and 7 as they grow, when being brought into contact with each other, the electroplating deposits 12a and 12b are likely to be united together. The deposition power and the ductility obtained by an electroplating method may also be improved by adjusting various plating solution conditions, such as the type of metal ions, concentration, current density, and additives.

As described above, in the laminate 5 before the above-described electroplating step is performed, the space "s" between the adjacent internal electrodes 3a and 3b is set to about 10 μm or less, and the withdrawn distance "d" of the internal electrodes 3a and 3b is set to about 1 μm or less.

As the space "s" is decreased, a plating growth length required for the electroplating deposits 12a and 12b, which are deposited in the steps shown in FIGS. 3 and 4, to be brought into contact with each other is decreases, and thus, the formation of the first plating layer 10 is facilitated. When the space "s" is more than about 10 μm, even when the electroplating deposits 12a and 12b grow, the probability that these deposits will be brought into contact with each other significantly decreases, and thus, is undesirable.

In addition, when the withdrawn distance "d" is about 1 μm or less, in electroplating using the above-described electrically conductive media, since the probability that the electrically conductive media is brought into contact with the exposed portions of the internal electrodes 3a and 3b is significantly increased, the metal ions are likely to be deposited, and thus, the uniformity of the electroplating deposits 12a and 12b is significantly improved.

As described above, when the electroplating is performed, electricity is supplied while the container is rotated, oscillated, or vibrated. The method in which the container is rotated is particularly preferable. In addition, when the rotation speed of the container is at least about 10 rpm, the electroplating deposits 12a and 12b are likely to grow substantially parallel to the end surface 6, which is preferable since the first plating layer 10 is more likely to be efficiently formed.

As a material for the first plating layer 10, a material including Ni as a primary component is preferable for the following reason. In general, in a laminated electronic component, since it is necessary to prevent a ceramic component from being dissolved, a strongly acidic or a strongly alkaline plating solution cannot be used, and as a result, a weakly acidic or a weakly alkaline plating solution must is used. However, in this situation, plating deposition metal ions are often unstable, and to avoid this problem, a complexing agent is frequently used to form a complex. However, in this preferred embodiment, when the plating layers 10 are directly formed on the end surfaces 6 and 7 of the laminate 5, this complexing agent may intrude into the laminate along the interfaces between the insulating layers 2 and the internal electrodes 3 and 4 and may dissolve a ceramic component and/or an internal electrode material. Thus, an ion solution which does not include a complexing agent is preferable. Accordingly, as a plating solution which can easily form a weakly alkaline ion solution including no complexing agent, for example, a Ni plating Watt bath having a pH of about 2.5 to about 6.0 may be used, and by using this plating solution, Ni plating is preferably performed.

In addition, when the first plating layer 10 is formed by Ni electroplating, in a Ni plating solution, a brightening agent is preferably included in addition to the Ni ions. Depending on the type of brightening agent used, various functions are obtained. The brightening agent facilitates the formation of the first plating layer 10, and the first plating layer 10 is formed to have a sufficient coverage at a reduced film thickness.

This brightening agent provides functions, such as (1) to improve plating deposition power in a lateral direction, (2) to improve ductility of a film, and (3) to smooth a film and increase coverage for concave portions. As long as any one of these functions is provided, the electroplating deposits grow in a lateral direction, and the first plating layer 10 is reliably formed. In addition, as secondary functions, the brightening agent also includes functions, such as (4) to increase adhesion by filling a film in very minute concave portions, and (5) to decrease a film stress so as to prevent film peeling.

In the brightening agent, sulfur is preferably included as a constituent element, and in particular, a sulfo group is preferably included.

Alternatively, a material for the first plating layer 10 preferably includes Cu as a primary component. Although Cu is not likely to form an ion solution under weakly acidic conditions when no complexing agent is used, as compared to Ni, the plating deposition power is high, and adhering properties are superior. Thus, a continuous film having a high coverage is easily formed. In addition, this Cu function is significantly improved when a heat treatment is performed after the plating layers 10 primarily composed of Cu are formed.

The external electrodes 8 and 9 are not always required to have a two-layered structure, as in the preferred embodiment shown in FIG. 1, and may be formed of a single layer or three or more layers. For example, a three-layered structure including a Cu plating layer, a Ni plating layer, and a Sn plating layer as a first, a second, and a third plating layer may be formed in that order, or a four-layered structure including a Ni plating layer, a Cu plating layer, a Ni plating layer, and a Sn plating layer as a first, a second, a third, and a fourth plating layer may be formed in that order.

Figure 6:
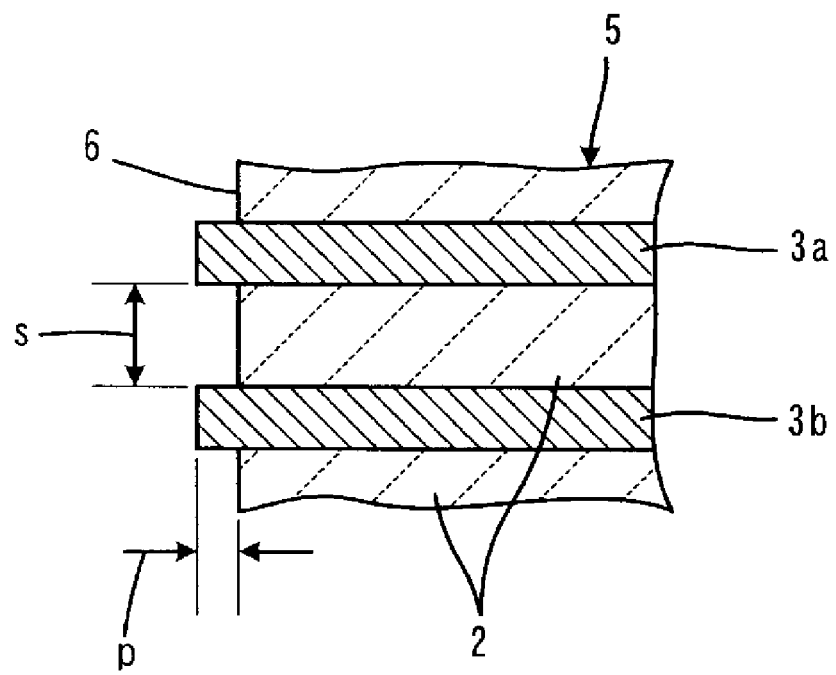
FIG. 6 is a cross-sectional view corresponding to FIG. 2, illustrating a second preferred embodiment of the present invention.

FIG. 6 is a view corresponding to FIG. 2, which illustrates a second preferred embodiment of the present invention. In FIG. 6, elements corresponding to those shown in FIG. 2 are designated by the same reference numerals as those described above, and duplicate descriptions thereof are omitted.

In the second preferred embodiment, the internal electrodes 3a and 3b protrude from the end surface 6. More specifically, the protruding length "p" of each of the internal electrodes 3a and 3b from the end surface 6 is at least about 0.1 μm. In addition, in this preferred embodiment, the space "s" between the adjacent internal electrodes 3a and 3b at the end surface 6 of the laminate 5, which is measured in the thickness direction of the insulating layers 2, is not necessarily decreased to about 10 μm or less, and a space of about 20 μm or less is sufficient.

In addition, since the protruding length "p" described above fluctuates to a certain extent in a longitudinal direction (direction perpendicular to the plane of FIG. 6) of an exposed internal electrode surface, the protruding length "p" in this preferred embodiment is an average value including the variation in the longitudinal direction.

As described above, by selecting the space "s" between the internal electrodes and the protruding length "p", during electroplating, the contact probability between the electrically conductive media and the internal electrodes 3a and 3b is further improved as compared to that in the first preferred embodiment.

In addition, since the other end surface 7 and the internal electrodes 4 (see FIG. 1) exposed at the other end surface 7 are substantially the same as the end surface 6 and the internal electrodes 3, described above, they are not shown in the FIG. 6, and descriptions thereof are omitted.

In order to form the protruding portion of the internal electrodes 3a and 3b at the end surface 6, a method may be used, for example, in which the abrading intensity is increased, or the hardness of an abrasive is increased by adding a metal thereto. In particular, when the insulating layers 2 are made of a ceramic, since a ceramic is easily milled as compared to the internal electrodes 3a and 3b, by appropriately modifying the method of sandblasting or barrel abrading, the state in which the internal electrodes 3a and 3b protrude is easily obtained. In addition, when laser abrading is used, since a ceramic can be selectively and effectively milled, the state in which the internal electrodes 3a and 3b protrude is easily obtained.

Figure 7:
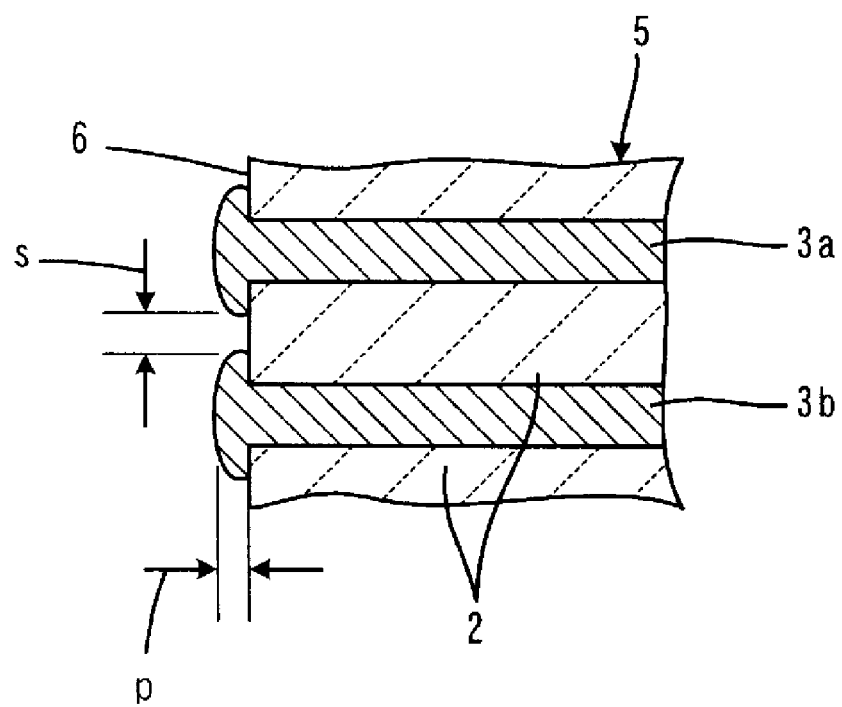
FIG. 7 is a cross-sectional view corresponding to FIG. 6, illustrating a third preferred embodiment of the present invention.

FIG. 7 is a view corresponding to FIG. 6, which illustrates a third preferred embodiment of the present invention. In FIG. 7, constituent elements corresponding to those shown in FIG. 6 are designated by the same reference numerals as those described above, and duplicate descriptions thereof are omitted.

Also in the preferred embodiment shown in FIG. 7, the space "s" between the adjacent internal electrodes 3a and 3b, which is measured in the thickness direction of the insulating layers 2, at the end surface 6 of the laminate 5 is about 20 μm or less, and the protruding length "p" of each of the internal electrodes 3a and 3b from the end surface 6 is at least about 0.1 μm.

The preferred embodiment which will be described with reference to FIG. 7 may be preformed, whenever necessary, after the step shown in FIG. 6. That is, when the ends of the internal electrodes 3a and 3b sufficiently protrude from the end surface 6, by continuous abrading, as shown in FIG. 7, the protruding ends of the internal electrodes 3a and 3b are pressed and are spread in a direction substantially parallel with the end surface 6. As a result, although the protruding length "p" of each of the internal electrodes 3a and 3b is decreased as compared to that in the state shown in FIG. 6, the space "s" between the adjacent internal electrodes 3a and 3b is also decreased as compared to that in the state shown in FIG. 6.

During electroplating, the length of the electroplating deposit, which should be grown, can be substantially decreased. Thus, the uniformity of the electroplating deposit is improved, and the plating efficiency is also improved. In addition, according to this preferred embodiment, even when the thickness of the insulating layer 2 located between the internal electrodes 3a and 3b is relatively thick, the space "s" therebetween can be decreased.

Figure 8:
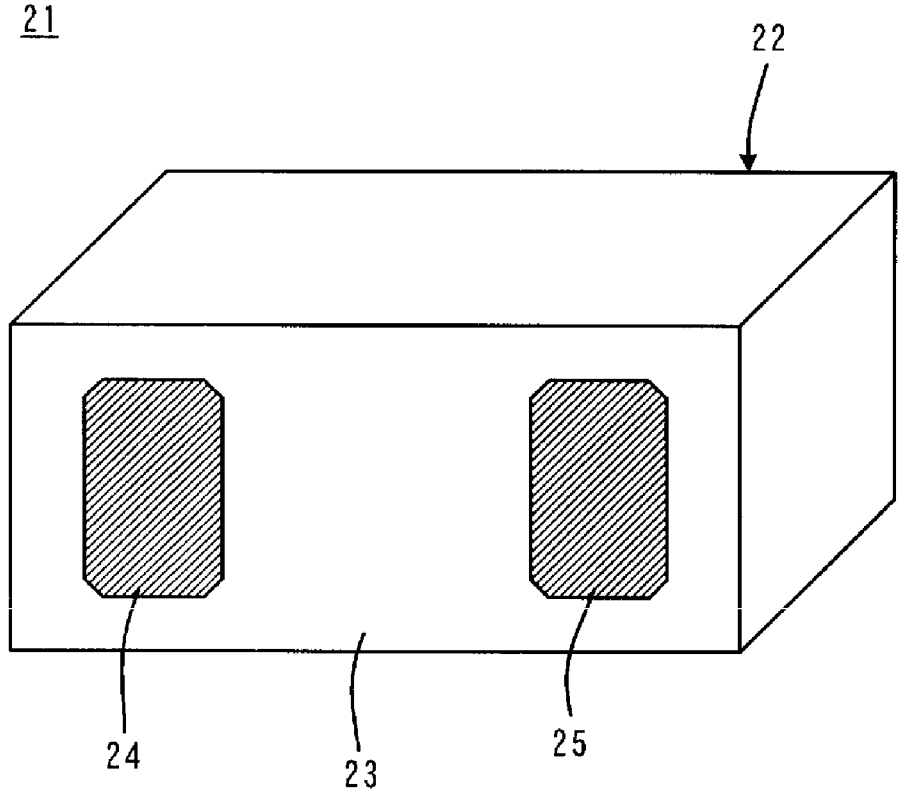
FIG. 8 is a perspective view showing a laminated electronic component according to a fourth preferred embodiment of the present invention.

FIG. 8 is a perspective view showing the appearance of a laminated electronic component 21 according to a fourth preferred embodiment of the present invention.

The laminated electronic component 21 shown in FIG. 8 includes a laminate 22. The laminated electronic component 21 includes a plurality of external electrodes, such as two external electrodes 24 and 25, formed on a specific surface 23 of the laminate 22.

Although not shown in the FIG. 8, the laminate 22 includes insulating layers laminated to each other and internal electrodes formed along interfaces between the insulating layers. Individual ends of the internal electrodes are exposed at the aforementioned surface 23 of the laminate 22 before the external electrodes 24 and 25 are formed, and the external electrodes 24 and 25 are formed to be electrically connected between the ends of the internal electrodes. When this laminated electronic component 21 is a laminated ceramic capacitor, it is configured to obtain electrostatic capacitance between the external electrodes 24 and 25.

The external electrodes 24 and 25 are formed substantially only from electroplating deposits as the case of the laminated electronic component 1 shown in FIG. 1.

To manufacture the laminated electronic component 21 shown in FIG. 8, when the external electrodes 24 and 25 are defined by paste electrode layers, the process thereof is very complicated. The reason for this is that a region of the external surface of the laminate 22 except for the locations at which the external electrodes 24 and 25 are to be formed must be masked, and for example, a complicated step, such as screen printing, is required. On the other hand, with this preferred embodiment, when electroplating deposits are directly deposited on the ends of the internal electrodes exposed at the predetermined surface 23 of the laminate 22, masking is not required, and thus, the process is greatly simplified. That is, the laminated electronic component 21 can be efficiently manufactured since the electroplating method as described above is used.

Figure 9:
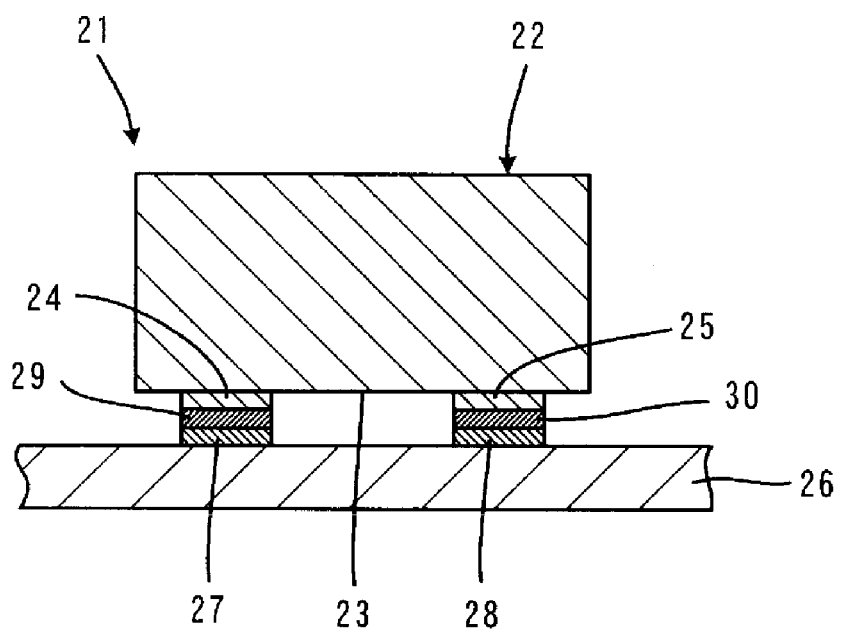
FIG. 9 is a cross-sectional view showing the laminated electronic component shown in FIG. 8 mounted on a substrate.

FIG. 9 shows the laminated electronic component 21 shown in FIG. 8 mounted on a substrate 26.

On a surface of the substrate 26, terminals 27 and 28 are provided. The external electrodes 24 and 25 of the laminated electronic component 21 are bonded to the terminals 27 and 28 with solders 29 and 30, respectively, provided therebetween. In this mounted state, the solder 29 is present only between the external electrode 24 and the terminal 27, and the solder 30 is present only between the external electrode 25 and the terminal 28.

Figure 10:
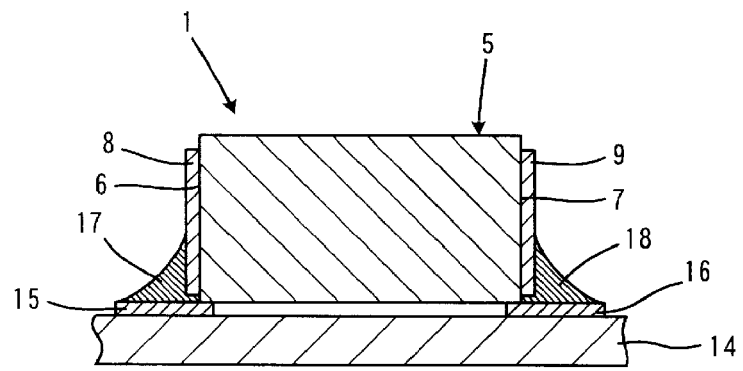
FIG. 10 is a cross-sectional view showing the laminated electronic component shown in FIG. 1 mounted on a substrate.
Figure 11:
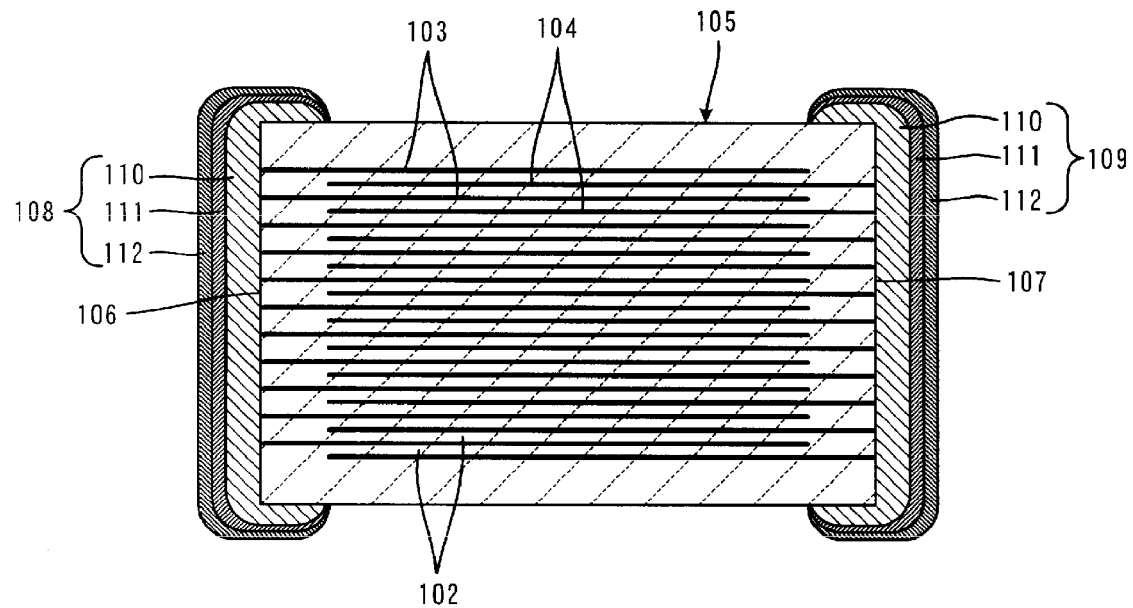
FIG. 11 is a cross-sectional view of a conventional laminated electronic component 101.

In addition, FIG. 10 shows the laminated electronic component 1 shown in FIG. 1 mounted on a substrate 14.

With the laminated electronic component 1 shown in FIG. 1, the external electrodes 8 and 9 are provided on the surfaces, which are substantially parallel with each other and face each other, and are not provided on the same planar surface. Thus, when the laminated electronic component 1 is mounted on the substrate 14, the surfaces on which the external electrodes 8 and 9 are located and the surface on which terminals 15 and 16 on the substrate 14 are located intersect approximately perpendicularly with each other. In the case described above, solders 17 and 18 which bond the external electrodes 8 and 9 to the terminals 15 and 16, respectively, are formed to have a fillet shape having a desired thickness, as shown in FIG. 10.

According to the above mounted state shown in FIG. 9, compared to the mounted state shown in FIG. 10, since the external electrodes 24 and 25 are provided on the same planar surface, the solder 29 and 30 do not have a fillet shape, and as a result, the mounting density on the substrate 26 can be increased.

In addition, when the laminated electronic component 21 is a laminated ceramic capacitor, since the amount of the solder 29 and 30 is relatively small because of the mounted state shown in FIG. 9, an equivalent series inductance (ESL) can be decreased. As a result, a phase shift amount when charging and discharging the capacitor is decreased, and thus, the laminated ceramic capacitor can be practically used particularly for high-frequency applications. Accordingly, the structure used for the laminated electronic component 21 can be preferably applied to a low ESL-type laminated capacitor. In addition, since the external electrodes 24 and 25 are formed only from the electroplating deposits, the low ESL properties are improved.

Heretofore, although the present invention has been described with reference to the preferred embodiments shown in FIGS. 1-10, various modifications may be made within the scope of the present invention.

For example, as the laminated electronic component to which the present invention is applied, first, a laminated chip capacitor may be provided. In addition, a laminated chip inductor, a laminated chip thermistor, and other suitable laminated components may be provided.

Accordingly, for the insulating layers provided in the laminated electronic component, any material may be used as long as it has an electrical insulating function. That is, in addition to a dielectric ceramic, the insulating layers may be made of a piezoelectric ceramic, a semiconductor ceramic, a magnetic ceramic, a resin, or other suitable electrical insulating material.

Hereinafter, to determine the range of preferred embodiments of the present invention, and to confirm the effects of preferred embodiments of the present invention, experimental examples were conducted and will be described below.

EXPERIMENTAL EXAMPLE 1

In Experimental Example 1, after laminates used for a laminated electronic component as shown in FIG. 1 were prepared in which the space "s" between internal electrodes and the withdrawn distance "d" or the protruding length "p", shown in FIG. 2 or 6, were variously changed, Ni plating layers were directly formed on individual end surfaces, and further Sn plating layers were formed on the Ni plating layers, so that the plating progress was investigated.

More specifically, as a plating substrate, a laminate for a laminated ceramic capacitor having a length of about 3.2 mm, a width of about 1.6 mm, and a thickness of about 1.6 mm was prepared, in which insulating layers were made of a barium titanate dielectric material, and the internal electrodes were primarily made of Ni. In addition, as for the space "s" of the adjacent internal electrodes, two types were prepared having spaces of about 10 µm and about 13 µm, which were each measured at a location having the largest space, as shown in Table 1. The average thickness of the internal electrode was about 1.0 µm.

These two types of laminates were processed by a sandblasting treatment using an alumina-based abrading powder so as to adjust the withdrawn distance "d" or the protruding length "p" with respect to the end surface of the laminate at which the internal electrodes are exposed. In addition, as shown in Table 1, for the withdrawn distance "d", two types were prepared having distances of about 2 µm and about 1 µm, which were measured at a location having a largest distance, and for the protruding length "p", one type having a length of about 1 µm measured at a location having a smallest length was prepared. For a sample having the withdrawn distance "d", sandblasting was performed at an intensity of about 0.25 MPa, and the withdrawn distance "d" was controlled by changing the amount of time the sandblasting was performed. For a sample having the protruding length "p", sandblasting was performed at an intensity of about 0.50 MPa, and the protruding length "p" was controlled by changing the amount of time the sandblasting was performed.

After the sandblasting was finished, the abrading powder was removed from the laminate by washing, followed by drying.

Next, the above-described laminates were charged in a rotating barrel having a volume of about 300 cc, and metal media having a diameter of about 0.6 mm were also charged. Subsequently, the rotating barrel was immersed in a Ni plating Watt bath having an adjusted pH of about 4.2 and a solution temperature of about 60° C., and electricity was supplied at a current density of about 0.04 A/dm$^2$ for about 300 minutes while the barrel was rotated at a rotation speed of about 60 rpm. With the method as described above, Ni plating layers having a thickness of about 4.0 µm were formed on the end surfaces of the laminate at which the internal electrodes were exposed.

Next, after the rotating barrel including the laminates provided with the Ni plating layers was immersed in a Sn plating solution (Sn-235 manufactured by Dipsol Chemical Co., Ltd.) having an adjusted pH of about 5.0 and a solution temperature of about 33° C., electricity was supplied at a current density of about 0.1 A/dm$^2$ for about 60 minutes while the barrel was rotated at a rotation speed of about 12 rpm. With the method as described above, Sn plating layers having a thickness of about 4.0 µm were formed on the Ni plating layers.

As described above, the laminated ceramic capacitors of the individual samples were obtained each having the external electrodes made of the electroplating layers which were directly formed on the laminates without forming paste electrode layers.

The obtained external electrodes were observed using a microscope, and an area ratio of uncovered portions was measured. For a sample having an area ratio of uncovered portions (uncovered rate) of 0%, the time necessary to provide the uncovered rate of 0% was measured. The results are shown in Table 1.

The electrical properties and the element structure of the laminated ceramic capacitor of each sample were not particularly different from those of a conventional product having paste electrode layers.

TABLE 1

| Sample No. | Withdrawn Distance "d" or Protruding Length "p" (μm) | Space "s" (μm) | Uncovered Rate (%) | Necessary Time (min) |
|---|---|---|---|---|
| 1 | d = 2 (withdrawn) | 10 | 40 | — |
| 2 | d = 2 (withdrawn) | 13 | 60 | — |
| 3 | d = 1 (withdrawn) | 10 | 0 | 120 |
| 4 | d = 1 (withdrawn) | 13 | 50 | — |
| 5 | p = 1 (protruding) | 10 | 0 | 90 |
| 6 | p = 1 (protruding) | 13 | 0 | 90 |

In Samples 1 and 2, since the end of the internal electrode was withdrawn too far from the end surface of the laminate, the uncovered rate was high. On the other hand, in Sample 3, since the withdrawn distance "d" was about 1 μm, the 0% uncovered rate could be achieved. However, as with Sample 4, although the withdrawn distance "d" was about 1 μm, when the space "s" between the adjacent internal electrodes was more than about 10 μm, the 0% uncovered rate could not be achieved.

In addition, in Samples 5 and 6, since the ends of the internal electrodes protruded from the exposed end surface, as compared to the case of Sample 3, the time necessary to form the plating layer was reduced, and the plating efficiency was increased. In addition, with of Sample 6, although the space "s" between the internal electrodes was relatively large, such as about 13 μm, the uncovered rate of 0% could be achieved.

EXPERIMENTAL EXAMPLE 2

In Experimental Example 2, when the Ni plating layers were directly formed on the end surfaces of the laminate for the laminated electronic component, various brightening agents were added to the respective Ni plating Watt baths, and the effects thereof were investigated.

As a plating substrate, the same laminates used for the laminated ceramic capacitor in Experimental Example 1 were prepared. In this laminate, the space "s" between the adjacent internal electrodes was about 10 μm which was measured at a location having a largest space.

Next, a sandblasting treatment was performed for each laminate, and the withdrawn distance "d" of the internal electrodes with respect to the end surface of the laminate at which the internal electrodes were exposed was set to about 0.1 μm at a location having a largest distance.

On the other hand, as shown in Table 2, 9 types of Ni plating Watt baths including various brightening agents, which were used for Samples 11 to 19, were prepared. In Table 2, trade names, primary components, and compositions of the brightening agents included in the plating solution are shown. In Sample 20, no brightening agent was included in the plating solution.

Next, by using the plating solutions for Samples 11 to 20, in order to form the Ni plating layers on the end surfaces of the laminates, the laminates were charged in a rotating barrel having a volume of about 300 cc, and metal media each having a diameter of about 0.6 mm were also charged. Subsequently, the rotating barrel was immersed in each of the Ni plating Watt baths (pH: about 4.2, a solution temperature: about 60° C.) for Samples 11 to 20 shown in Table 2, and electricity was supplied at a current density of about 0.04 A/dm² while the barrel was rotated at a rotation speed of about 60 rpm. The supply of electricity was stopped when Ni plating deposits were grown into a continuous film and when the coverage thereof reached 95%.

The thickness of the Ni plating film at this stage was measured. These thicknesses are shown Table 2. In this case, the coverage is the ratio which is defined such that, on the end surface at which the internal electrodes are exposed, a region in which a plating film is to be formed through the above-described steps sequentially shown in FIGS. 2 to 5 is completely covered with the plating film is denoted as 100%.

TABLE 2

| Sample No. | Trade Name of Brightening Agent | Primary Component of Brightening Agent | Composition | Thickness at a Coverage of 95% |
|---|---|---|---|---|
| 11 | NL-BL (manufactured by Ebara-Udylite Co., Ltd.) | aromatic sulfoneamide derivative, unsaturated alkylsulfonate | NL-BL: 3 ml/L, #82: 2 ml/L | 3.4 μm |
| 12 | PIKATEL PK-01BL (manufactured by Ebara-Udylite Co., Ltd.) | aromatic sulfoneamide derivative, heterocyclic alkylsulfone compound | PK-mu: 15 ml/L, PK-CL: 0.5 ml/L PK-01BL: 0.2 ml/L, #62: 2 ml/L | 3.6 μm |
| 13 | M&T #323 Barrel (manufactured by Atotech Japan K.K.) | saccharin sodium, sodium alkanesulfonate, formaldehyde, 2-butyne-1,4-diol | A-5: 30 g/L, SA-1: 5 g/L Y-17: 1 g/L, M326 conc.: 1 ml/L | 2.7 μm |
| 14 | M&T Trolume 2KL (manufactured by Atotech Japan K.K.) | saccharin sodium, sodium alkanesulfonate, formaldehyde, 2-butyne-1,4-diol | A-5: 30 ml/L, SA-1: 3.0 ml/L Y-17: 1 ml/L, Trolume 2KL: 0.5 ml/L | 2.6 μm |
| 15 | LEVENON A (manufactured by Nikko Metal Plating Co., Ltd.) | sodium benzenesulfonate | LEVENON A: 10 ml/L | 2.5 μm |

TABLE 2-continued

| Sample No. | Trade Name of Brightening Agent | Primary Component of Brightening Agent | Composition | Thickness at a Coverage of 95% |
|---|---|---|---|---|
| 16 | LEVENON Y (manufactured by Nikko Metal Plating Co., Ltd.) | aromatic sulfonated compound, sodium alkenesulfonate | LEVENON Y: 10 ml/L | 2.6 μm |
| 17 | LEVENON LS (manufactured by Nikko Metal Plating Co., Ltd.) | aromatic sulfonated compound, sodium alkenesulfonate | LEVENON LS: 15 ml/L | 2.5 μm |
| 18 | HI NICKEL VL (manufactured by Shimizu Co., Ltd.) | aromatic sulfonate, aliphatic sulfonate, acetylene derivative, cyclic amino derivative | HI NICKEL VL-1: 20 ml/L, HI NICKEL VL-2: 0.05 ml/L | 3.0 μm |
| 19 | HI NICKEL FBN-01 (manufactured by Shimizu Co., Ltd.) | aromatic sulfonate, aliphatic sulfonate, acetylene derivative, cyclic amino derivative | FBN-01 MAKE: 20 ml/L, FBN-01X: 0.5 ml/L | 2.9 μm |
| 20 | None | — | — | 4.0 μm |

The thicknesses of Samples 11 to 19 were in the range of about 2.5 μm to about 3.6 μm and were less than that of Sample 20 in which no brightening agent was included. That is, it was found that by adding the brightening agent, a continuous Ni film could be efficiently formed with a relatively small film thickness.

In addition, the brightening agent has the functions, such as (1) to improve plating deposition power in a lateral direction, (2) to improve ductility of a film, and (3) to smooth a film and increase coverage for concave portions, as described above. As long as any one of the above functions is provided, the electroplating deposits grow in a lateral direction, and thus, a plating layer is likely to be formed. In addition, as secondary functions, the brightening agent also has functions, such as (4) to increase adhesion by filling a film in very minute concave parts, and (5) to decrease a film stress so as to prevent film peeling.

According to the brightening agent of Sample 11, the above functions (2) and (5) were primarily obtained. As described above, according to the brightening agents of Samples 12, 13, and 14, the above functions (1), (2), (3), and (5) were obtained; according to the brightening agents of Samples 15, 16, and 17, the above functions (1), (2), and (4) were obtained; according to the brightening agent of Sample 18, the above functions (1) and (3) were obtained; and according to the brightening agent of Sample 19, the above functions (1), (2), and (3) were obtained.

EXPERIMENTAL EXAMPLE 3

In Experimental Example 3, after Cu plating layers were directly formed on a surface of a laminate used for a laminated ceramic capacitor having the structure as shown in FIG. 8 at which internal electrodes were exposed, Ni plating layers and Sn plating layers were further formed, so that the completed laminated ceramic capacitor was formed.

More specifically, as a plating substrate, a laminate for a laminated ceramic capacitor, which included insulating layers made of a barium titanate dielectric material and internal electrodes primarily made of Ni, was prepared. The above laminate had a length of about 3.2 mm, a width of about 1.6 mm, and a thickness of about 1.6 mm; one of two surfaces of the laminate, which were defined as the length direction dimension and the thickness direction dimension, was used as a surface on which external electrodes were to be formed; and the internal electrodes were exposed at two predetermined locations of the above one surface. The space "s" between adjacent internal electrodes of this laminate, which was measured in the thickness direction of the insulating layers, was about 10 μm at a location having a largest space. In addition, the average thickness of the internal electrode was about 1.0 μm.

Next, the withdrawn distance "d" of the internal electrodes with respect to the surface at which the internal electrodes were exposed, which was obtained by performing barrel abrading for the laminate, was set to about 0.1 μm at a location having a largest distance.

Next, the laminate was charged in a rotating barrel having a volume of about 300 cc, and metal media each having a diameter of about 0.4 mm were also charged. Subsequently, the rotating barrel was immersed in a Cu plating strike solution having an adjusted pH of about 8.5 and a solution temperature of about 25° C., and electricity was supplied at a current density of about 0.11 A/dm² for about 60 minutes while the barrel was rotated at a rotation speed of about 50 rpm, so that Cu plating layers having a thickness of about 0.7 μm were directly formed on the surface of the laminate at which the internal electrodes were exposed.

The above Cu plating strike solution contained about 14 g/L of copper pyrophosphate, about 120 g/L of potassium pyrophosphate, and about 10 g/L of potassium oxalate.

Next, the rotating barrel including the laminate provided with the Cu plating layers was immersed in a Cu plating pyrophosphoric acid solution (Pyrobrite system manufactured by C Uyemura & Co., Ltd.) having an adjusted pH of about 8.8 and a solution temperature of about 25° C., and electricity was supplied at a current density of about 0.30 A/dm² for about 60 minutes while the barrel was rotated at a rotation speed of about 50 rpm. As described above, Cu plating layers were formed on the above-described Cu plating layers, so that the total thickness of the Cu plating layers was about 10 μm.

Furthermore, the rotating barrel including the laminate provided with the above Cu plating layers was immersed in a Ni plating Watt bath having an adjusted pH of about 4.2 and a solution temperature of about 60° C., and electricity was supplied at a current density of about 0.04 A/dm² for about 300 minutes while the barrel was rotated at a rotation speed of about 60 rpm. As described above, Ni plating layers having a thickness of about 2.5 μm were formed on the Cu plating layers.

Next, after the rotating barrel including the laminate provided with the Ni plating layers was immersed in a Sn plating solution (Sn-235 manufactured by Dipsol Chemical Co., Ltd.) having an adjusted pH of about 5.0 and a solution temperature of about 33° C., electricity was supplied at a current density of about 0.1 A/dm$^2$ for about 60 minutes while the barrel was rotated at a rotation speed of about 12 rpm. With method as described above, Sn plating layers having a thickness of about 4.0 μm were formed on the Ni plating layers.

As described above, the plating layers defining the external electrodes could be formed directly on the laminate without forming paste electrode layers and without performing masking. In addition, the electrical properties and the element structure of the laminated ceramic capacitor thus formed were not particularly different from those of a conventional product including paste electrode layers for external electrodes. In addition, the uncovered rate of the external electrode was approximately 0%.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A method for manufacturing a laminated electronic component, comprising:
   a step of preparing a laminate including insulating layers laminated to each other, and internal electrodes formed along interfaces between the insulating layers, ends of the internal electrodes being exposed at a predetermined surface of the laminate; and
   a step of forming an external electrode on the predetermined surface of the laminate so that the ends of the internal electrodes exposed at the predetermined surface of the laminate are electrically connected to each other; wherein
   in the laminate prepared in the step of preparing a laminate, the internal electrodes adjacent to each other at the predetermined surface at which the internal electrodes are exposed are electrically insulated from each other, a space between the internal electrodes adjacent to each other, which is measured in the thickness direction of the insulating layers, is about 10 μm or less, and a withdrawn distance of the internal electrodes from the predetermined surface is about 1 μm or less;
   the step of forming an external electrode includes an electroplating step of performing electroplating directly on the ends of the internal electrodes exposed at the predetermined surface of the laminate which is prepared in the step of preparing a laminate; and
   the electroplating step includes a step of performing plating growth of electroplating deposits deposited on the ends of the internal electrodes so that the electroplating deposits are connected to each other.

2. The method for manufacturing a laminated electronic component, according to claim 1, further comprising, before the step of forming an external electrode, an abrading step of abrading the laminate using an abrasive.

3. The method for manufacturing a laminated electronic component, according to claim 2, wherein the abrading step includes a step of performing sandblasting or barrel abrading.

4. The method for manufacturing a laminated electronic component, according to claim 1, wherein the electroplating step includes a step of depositing the electroplating deposits, in which the laminate and electrically conductive media are charged in a container provided with electricity supply terminals, the container is immersed in a plating solution including metal ions, and electricity is supplied while the container is rotated, and the rotation speed of the container is selected to be at least about 10 rpm.

5. The method for manufacturing a laminated electronic component, according to claim 1, wherein the electroplating step includes a step of depositing electroplating deposits primarily composed of Ni, in which the laminate is charged in a container provided with electricity supply terminals, the container is immersed in a plating solution, and electricity is supplied.

6. The method for manufacturing a laminated electronic component, according to claim 5, wherein the plating solution has a pH of about 2.5 to about 6.0 and includes substantially no complexing agent which forms a Ni complex.

7. The method for manufacturing a laminated electronic component, according to claim 5, wherein the plating solution includes a brightening agent.

8. The method for manufacturing a laminated electronic component, according to claim 7, wherein the brightening agent includes at least sulfur.

9. The method for manufacturing a laminated electronic component, according to claim 1, wherein the electroplating step includes a step of depositing plating deposits primarily formed of Cu, in which the laminate is charged in a container provided with electricity supply terminals, the container is immersed in a plating solution, and electricity is supplied.

10. A method for manufacturing a laminated electronic component, comprising:
    a step of preparing a laminate including insulating layers laminated to each other, and internal electrodes formed along interfaces between the insulating layers, ends of the internal electrodes being exposed at a predetermined surface of the laminate; and
    a step of forming an external electrode on the predetermined surface of the laminate so that the ends of the internal electrodes exposed at the predetermined surface of the laminate are electrically connected to each other; wherein
    in the laminate prepared in the step of preparing a laminate, the internal electrodes adjacent to each other at the predetermined surface at which the internal electrodes are exposed are electrically insulated from each other, a space between the internal electrodes adjacent to each other, which is measured in the thickness direction of the insulating layers, is about 20 μm or less, and a protruding length of the internal electrodes from the predetermined surface is at least about 0.1 μm;
    the step of forming an external electrode includes an electroplating step of performing electroplating directly on the ends of the internal electrodes exposed at the predetermined surface of the laminate which is prepared in the step of preparing a laminate; and
    the electroplating step includes a step of performing plating growth of electroplating deposits deposited on the ends of the internal electrodes so that the electroplating deposits are connected to each other.

11. The method for manufacturing a laminated electronic component, according to claim 10, further comprising, before the step of forming an external electrode, an abrading step of abrading the laminate using an abrasive.

12. The method for manufacturing a laminated electronic component, according to claim 11, wherein the abrading step includes a step of performing sandblasting or barrel abrading.

13. The method for manufacturing a laminated electronic component, according to claim 10, wherein the electroplating step includes a step of depositing the electroplating deposits, in which the laminate and electrically conductive media are charged in a container provided with electricity supply terminals, the container is immersed in a plating solution including metal ions, and electricity is supplied while the container is rotated, and the rotation speed of the container is selected to be at least about 10 rpm.

14. The method for manufacturing a laminated electronic component, according to claim 10, wherein the electroplating step includes a step of depositing electroplating deposits primarily composed of Ni, in which the laminate is charged in a container provided with electricity supply terminals, the container is immersed in a plating solution, and electricity is supplied.

15. The method for manufacturing a laminated electronic component, according to claim 14, wherein the plating solution has a pH of about 2.5 to about 6.0 and includes substantially no complexing agent which forms a Ni complex.

16. The method for manufacturing a laminated electronic component, according to claim 14, wherein the plating solution includes a brightening agent.

17. The method for manufacturing a laminated electronic component, according to claim 16, wherein the brightening agent includes at least sulfur.

18. The method for manufacturing a laminated electronic component, according to claim 10, wherein the electroplating step includes a step of depositing plating deposits primarily formed of Cu, in which the laminate is charged in a container provided with electricity supply terminals, the container is immersed in a plating solution, and electricity is supplied.

* * * * *